US012323530B2

(12) United States Patent
Heart et al.

(10) Patent No.: US 12,323,530 B2
(45) Date of Patent: Jun. 3, 2025

(54) SYSTEMS AND METHODS FOR MANAGING PARTIAL PRIVATE KEYS FOR CRYPTOGRAPHY-BASED, STORAGE APPLICATIONS USED IN BLOCKCHAIN OPERATIONS FOR DECENTRALIZED APPLICATIONS

(71) Applicant: Coinbase, Inc., Oakland, CA (US)

(72) Inventors: Cassandra Alexandria Heart, Wichita, KS (US); Peter Jihoon Kim, Oakland, CA (US); Ben Schreck, Oakland, CA (US); Olivia Thet, Oakland, CA (US); Jonathan Ariel Bergknoff, Richardson, TX (US); Ankit Chiplunkar, Oakland, CA (US); Ethan Leland, Oakland, CA (US); Trevor Aron, Oakland, CA (US)

(73) Assignee: Coinbase, Inc., Oakland, CA (US)

( * ) Notice: Subject to any disclaimer, the term of this patent is extended or adjusted under 35 U.S.C. 154(b) by 362 days.

(21) Appl. No.: 17/729,563

(22) Filed: Apr. 26, 2022

(65) Prior Publication Data
US 2023/0344641 A1 Oct. 26, 2023

(51) Int. Cl.
*H04L 9/32* (2006.01)
*H04L 9/00* (2022.01)
*H04L 9/08* (2006.01)

(52) U.S. Cl.
CPC .......... *H04L 9/3242* (2013.01); *H04L 9/0819* (2013.01); *H04L 9/50* (2022.05)

(58) Field of Classification Search
CPC ..... H04L 9/08–0894; H04L 9/30–3297; H04L 9/50
See application file for complete search history.

(56) References Cited

U.S. PATENT DOCUMENTS

| 8,234,302 B1* | 7/2012 | Goodwin | H04L 63/107 726/28 |
| 2017/0262639 A1* | 9/2017 | D'Souza | H04L 63/0428 |

(Continued)

FOREIGN PATENT DOCUMENTS

| WO | WO-2006059849 A1 * | 6/2006 | G06F 16/955 |
| WO | WO-2018194736 A1 * | 10/2018 | G06Q 20/105 |

OTHER PUBLICATIONS

Rosario Gennaro et al., "One Round Threshold ECDSA with Identifiable Abort," 2020 (32 pages).

(Continued)

*Primary Examiner* — Madhuri R Herzog
(74) *Attorney, Agent, or Firm* — Foley & Lardner LLP

(57) ABSTRACT

Methods and system for managing partial private keys for cryptography-based, storage applications used in blockchain operations and/or facilitating secure authentication when conducting blockchain operations using cryptography-based, storage applications. For example, the methods and system may perform a plurality of blockchain operations for digital assets stored in a first cryptography-based, storage application, wherein the first cryptography-based, storage application corresponds to a first partial private key, and wherein the first partial private key is stored on a first user device, and wherein the second partial private key is not accessible to platform service facilitating the first cryptography-based, storage application.

20 Claims, 7 Drawing Sheets

(56) References Cited

U.S. PATENT DOCUMENTS

| | | | | |
|---|---|---|---|---|
| 2018/0213059 | A1* | 7/2018 | Alsina | H04L 67/55 |
| 2018/0218454 | A1* | 8/2018 | Simon | H04L 9/3239 |
| 2018/0323970 | A1* | 11/2018 | Maron | H04L 9/0891 |
| 2018/0367298 | A1* | 12/2018 | Wright | H04L 9/3247 |
| 2019/0114182 | A1 | 4/2019 | Chalakudi et al. | |
| 2019/0312878 | A1* | 10/2019 | Brown | H04L 63/045 |
| 2020/0005282 | A1* | 1/2020 | Kim | G06Q 20/065 |
| 2020/0067907 | A1 | 2/2020 | Avetisov et al. | |
| 2020/0366473 | A1* | 11/2020 | Brooks | H04L 9/30 |
| 2021/0056541 | A1* | 2/2021 | Kim | G06Q 20/3825 |
| 2022/0318907 | A1* | 10/2022 | Bleznak | G06Q 20/065 |
| 2023/0325815 | A1* | 10/2023 | Parker | G06Q 20/3821 |
| | | | | 705/67 |

OTHER PUBLICATIONS

Non-Final Office Action issued in U.S. Appl. No. 17/729,586 on Jun. 4, 2024.

* cited by examiner

SYSTEMS AND METHODS FOR MANAGING PARTIAL PRIVATE KEYS FOR CRYPTOGRAPHY-BASED, STORAGE APPLICATIONS USED IN BLOCKCHAIN OPERATIONS FOR DECENTRALIZED APPLICATIONS

BACKGROUND

In recent years, the use of blockchains and blockchain technology has exponentially increased. Blockchains comprise a list of records, called "blocks," that are "chained" together using cryptography. Each block may comprise data that is computed using a one-way function (e.g., a function that is practically impossible to invert or reverse-compute) of a previous block, a timestamp (e.g., indicating a creation and/or modification time), and additional data (e.g., transactional or operational data related to blockchain operations).

While publicity for blockchains and blockchain technology has been concentrated on its use for cryptocurrencies and smart contracts, blockchains and blockchain technology may be applicable to numerous technological avenues. A common theme of the technological avenues is the manner in which blockchains and blockchain technology are decentralized such that facilitation, management, and/or verification of blockchain-based operations is governed or administered not by any one authority but instead by a community of users. The blockchain may therefore remain distributed (e.g., on a network of computers that communicate and coordinate their actions by passing messages to one another), and in many cases public, through a digital ledger, which records the series of blocks forming the chain. Notably, because each block depends on a preceding block, edits to existing blocks in the chain may not be made without affecting subsequent blocks.

Furthermore, updates to the blockchain (e.g., the addition of new blocks) may include incentivization systems that reward community members for the generation of the updates while also ensuring a consensus by the community. By doing so, the proliferation of the blockchain may proceed indefinitely.

SUMMARY

Methods and systems are described herein for novel uses and/or improvements to blockchains and blockchain technology. As one example, methods and systems are described herein for facilitating blockchain operations in decentralized applications by offering enhanced security when conducting blockchain operations using cryptography-based, digital ledgers. For example, as a digital ledger is immutable (or practically immutable) blockchain operations, digital ledgers, and/or cryptocurrencies based on digital ledger technology present a perfect mechanism for conducting transactions in decentralized application as the use of the blockchain operations may be performed without a central administrator.

In conventional system, security for digital ledgers and/or cryptocurrencies is focused on the use of cryptography-based, storage applications (e.g., digital wallets). Each digital wallet is tied to a unique, private key associated with the digital wallet. The loss of the private key may prevent a user from accessing any assets in the digital wallet. Additionally, if the private key is comprised, unauthorized users may obtain the digital assets, with the owner having little recourse. To combat this, conventional systems rely on users to manage their own private keys. While this has added security benefits (i.e., no third-party has access to the private key), it places the management burden on the users, and exposes the users to the risk of (i) the inability to access their assets if the private key is lost or (ii) the loss of the funds if the private key is compromised. These risks are intensified if users wish to use their digital wallet (and/or private keys) to interact with third-party decentralized applications as each interaction may risk a security breach.

A potential alternative to this problem is to allow a trusted third-party to manage the private keys when interacting with the other third-party decentralized applications to ensure that the private key is not lost and/or compromised. This alternative, however, requires exposing the private key to the trusted third-party and does not totally negate the risk that the private key is comprised during the interactions with the third-party decentralized applications.

In order to relive users of the management burden while maintaining security during the interactions with the third-party decentralized applications, the system improves upon conventional systems by using a partial private key management service. That is, users will store a first share of the private key (e.g., in a first cryptography-based, storage application on their user devices), and the system will store the second share of the private key in a custodial digital wallet (e.g., a second cryptography-based, storage application on a remote server). Only through the use of both partial private keys may blockchain operations occur. As such, even if one partial private key is compromised, the assets of the user are secured.

This however raises an additional technical problem in that if the user device (e.g., storing a partial key) is lost or the user wishes to conduct blockchain operations using multiple devices, the private key management service must have a mechanism for accessing and/or authenticating the user device and/or the first partial private key if the user is unable to access their funds. To account for such a scenario, the methods and systems may further allow a user to receive an encrypted communication for the first user device, wherein the encrypted communication comprises instructions, that when executed by the first user device, causes the second partial private key to be stored on the first user device. That is, the private key management service may provide instructions that allow users to recover their portion of the partial private key, even though that portion is not accessible by the private key management service itself. Additionally, the private key management service may provide a decentralized application browser that allows users to conduct blockchain operations securely with other third-party decentralized applications. The system provides this by triggering the authentication and digital signature signing process directly through the decentralized application browser as opposed to a user generating a digitally signed communication directly on a user device and then processing the digitally signed communication through other third-party decentralized applications. As such, methods and system for managing partial private keys for cryptography-based, storage applications used in blockchain operations and/or facilitating secure authentication when conducting blockchain operations using cryptography-based, storage applications are described.

In some aspects, the system may receive, from a first user device, a first user request to access a first user account corresponding to a first cryptography-based, storage application, wherein the first cryptography-based, storage application is used to perform a plurality of blockchain operations across a computer network based on a combined use of a first public key, a first partial private key, and a second partial private key, and wherein the second partial private key is not accessible to platform service facilitating the first cryptography-based, storage application. The system may, in response to receiving the first user request, authenticate, at a first remote device, the first user device as corresponding to the first user account. The system may, in response to authenticating the first user device, generating an encrypted communication for the first user device, wherein the encrypted communication comprises instructions, that when executed by the first user device, causes the second partial private key to be stored on the first user device. The system may transmit the encrypted communication to the first user device. The system may register, at the platform service, the first user device as corresponding to the first user account.

In some aspects, the system may receive, from a decentralized application browser implemented on a first user device, a first user request to perform a blockchain operation corresponding to a first public key. The system may, in response to receiving the first user request, accessing, via an application programming interface ("API") implemented on a first remote device, a first user account corresponding to the first public key, wherein a first cryptography-based, storage application corresponding to the first user account is accessible to the first remote device. The system may retrieve, from the first user account, a first partial private key and a first user address. The system may query the first user device for use of a second partial private key in performing the blockchain operation, wherein the second partial private key is stored on the first user device. The system may generate a first digital signature based on the first partial private key and the second partial private key. The system may perform the blockchain operation based on the first digital signature and the first user address.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
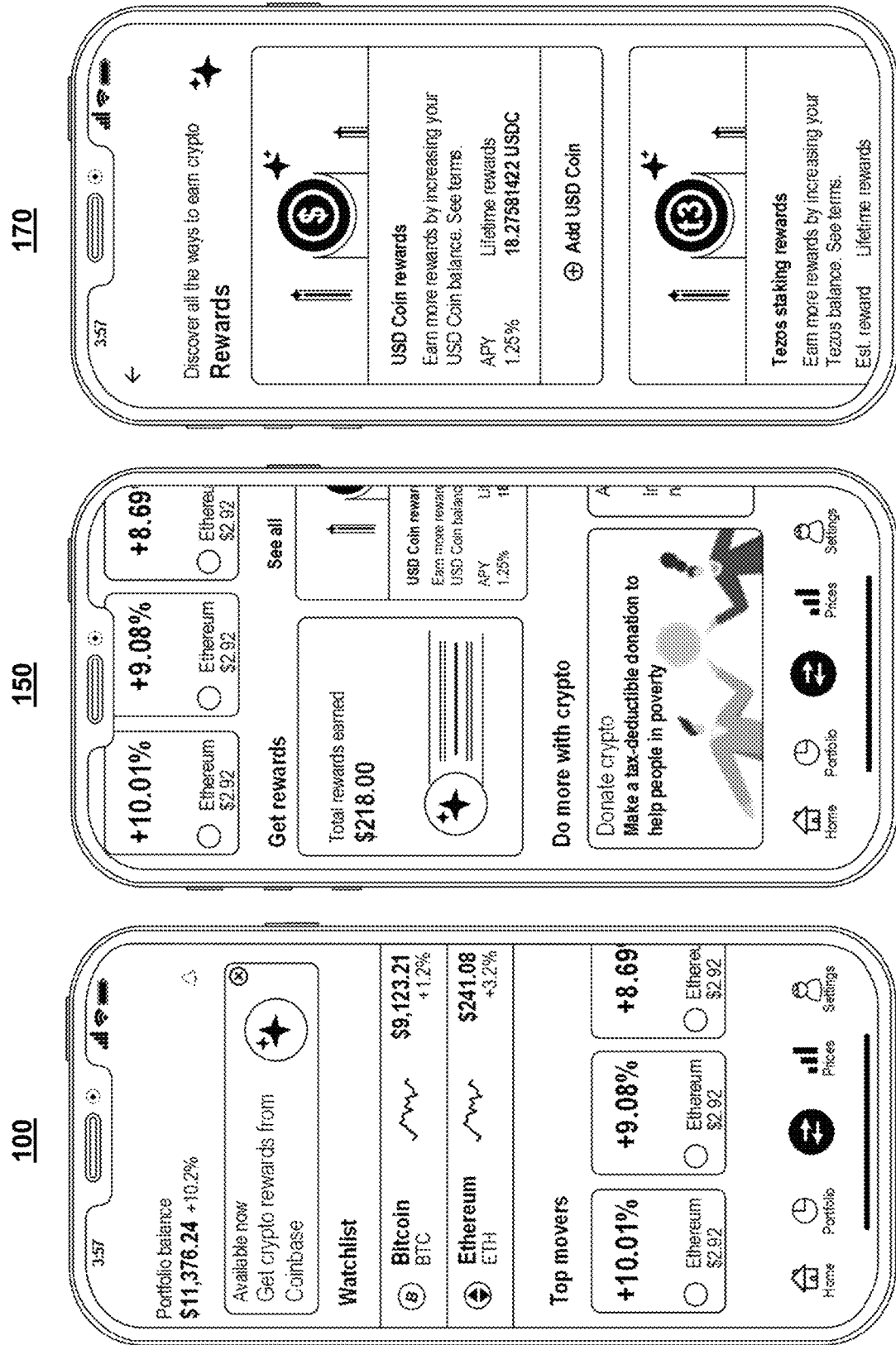
FIG. 1 shows illustrative user interfaces for a decentralized application browser, in accordance with one or more embodiments.

FIG. 1 shows illustrative user interfaces for a decentralized application browser, in accordance with one or more embodiments. For example, user interface 100, user interface 150, and user interface 170 may for represent a decentralized browser application for managing partial private keys for cryptography-based, storage applications used in blockchain operations and/or facilitating secure authentication when conducting blockchain operations using cryptography-based, storage applications. For example, FIG. 1 illustrates a decentralized application browser implemented on a first user device configured to receive user requests for performing a plurality of blockchain operations across a computer network and access a second partial private key that is stored on the first user device. To provide security when conducting blockchain operations, the system may further access an application programming interface ("API") implemented on a first remote device configured to receive a first user request to perform a blockchain operation corresponding to a first public key and access a first user account corresponding to the first public key in response to receiving the first user request, wherein a first cryptography-based, storage application corresponding to the first user account is accessible to the first remote device through a platform application, and wherein the first cryptography-based, storage application is used to perform the plurality of blockchain operations.

For example, as inherent feature of blockchain technology requires that a digital wallet is linked to a specific blockchain address, the assets in the custodial digital wallet (i.e., the digital wallet maintained at the remote server) may only be accessed via the remote server. The system must therefore provide a mechanism for receiving user requests and accessing user accounts. That is, the system must determine what account, device, and/or partial private key to request in order to facilitate the blockchain operation. Upon doing so, the system may retrieve, from the first user account, a first partial private key and a first user address, query the first user device for use of a second partial private key in performing the blockchain operation, generate a first digital signature based on the first partial private key and the second partial private key, and perform the blockchain operation based on the first digital signature and the first user address.

For example, the system may allow a user accessing a user interface (e.g., user interface 100, user interface 150, and user interface 170) to use a decentralized application browser to perform numerous blockchain operations as shown in FIG. 1 such as monitor value of digital assets, transfer digital assets, and/or receive recommendations, rewards, and other content related to decentralized applications.

Furthermore, the decentralized application browser provides the additional functionality of facilitating the blockchain operation by communicating with a blockchain platform service that is configured to access the first cryptography-based, storage application and access a blockchain indexing service to perform the blockchain operation. For example, the system (e.g., a private key management service) may provide a decentralized application browser (e.g., as shown in user interface 100, user interface 150, and user interface 170) that allows users to conduct blockchain operations securely with other third-party decentralized applications (which may be accessed via the decentralized application browser). The system achieves this by authenticating a user device upon the user device accessing decentralized application browser (or a user account on the decentralized application browser). The system then allows the user to perform functions within the decentralized application browser ecosystem, including conducting blockchain operations. When conducting blockchain operations, the system (e.g., via decentralized application browser) initiates the digital signature process by transmitting encrypted communications between an API layer and the user device. The system receives a response to its queries to the user device to facilitate the digital signing process. During this process, neither partial private key is exposed to either the counterpart devices (e.g., the user device or the remote server hosting the private key management service) or the third-party decentralized applications that the user wishes to interact with. As such, the system facilitates the digital signature signing process directly through the decentralized application browser as opposed to a user generating a digitally signed communication directly on a user device and then processing the digitally signed communication through other third-party decentralized applications. For example, a platform service may comprise a cloud computing service that allows customers to provision, instantiate, run, and manage a modular bundle comprising a computing platform and one or more applications, without the complexity of building and maintaining the infrastructure typically associated with developing and launching the application.

For example, the system may use a multi-party computation ("MPC") system. MPC involves the use of multiple parties, each of which holds respective private data that may be used to evaluate a computation without ever revealing any of the private data held by each party. For example, each party of the multiple parties may possess private data (e.g., $d_1, d_2, \ldots, d_N$). Together, the parties may use their respective private data to compute a value of a public function: (e.g., $F(d_1, d_2, \ldots, d_N)$). While the private data is used to compute a value based on the function, the private data is kept private during that process.

The use of an MPC-based key lessens the risk involved with the loss of a private key and/or the private key being accessed by unauthorized parties. For example, conventional key-share systems rely on a public-private key configuration where the security of the system is tied to the private key remaining private. In some cases, these keys are stored in various cryptography-based digital repositories (or digital wallets). These digital wallets may have various configurations, typically categorized by whether the private key is held online or offline. For example, a hot storage wallet has a private key held online. A cold storage wallet has a private key held offline, and a hardware wallet has a private key held offline and on a physical device (e.g., a thumb drive). While holding a private key offline and/or tying the private key to a physical device is beneficial from a security perspective, this creates practical problems when attempting to conduct operations using the digital wallet. For example, to conduct an operation, a user must be able to access the private key from its offline location and/or the physical device. This is particularly burdensome for MPC-based key operations as it requires each user (e.g., corresponding to a respective private key) to be available at a given time.

Furthermore, the use of a private key stored at an offline location and/or the physical device increases the risk that the offline location becomes inaccessible and/or the physical device is lost. In such cases, the digital wallet and any digital assets therein may be lost as well. This creates a critical flaw in MPC-based key operations as the loss of any one key may result in the loss of digital assets for all of the parties. The methods and systems described herein overcome this problem through the use of threshold signing requirements, separate approval and signing policies, independent key recovery mechanisms, and cohort/group key creation. More specifically, the methods and systems described herein alleviate flaws in the MPC-based key operations by creating MPC-based key operations in which the MPC relies on partial private keys. In such cases, a partial private key is maintained online (e.g., in a hot wallet), whereas other partial private keys may remain offline. Furthermore, due to the use of the partial private keys, the exposure of the online partial private key does not in and of itself create a security risk (e.g., as multiple partial private keys, including an offline partial key, are required for conducting blockchain operations), and the loss of the offline partial private key (e.g., stored on a user device) does not create a risk of the loss of digital assets (e.g., as the online partial private key may be used to recover the offline private partial key).

The MPC-based key operations maintain flexibility in the algorithm used. For example, the system may use online MPC algorithms such as the Gennaro and Goldfeder MPC algorithm and the Lindell et al. MPC algorithm. The online MPC algorithms have two limitations that restrict their use in conventional systems. First, they require users to wait for blockchain operations to undergo up to eight to twelve signatures rounds, which can create latency issues. Second, they require the use of online storage for private keys. Due to the use of partial private keys (e.g., comprises an online and offline pair), the system may use online MPC algorithms. Furthermore, given that the online requirement for the online MPC algorithms is satisfied by the online partial private key, the system may use the online MPC algorithms while maintaining the offline partial private key (e.g., increasing overall security).

Additionally, the MPC-based key operations used by the system may include offline and/or online hybrid MPC algorithms. For example, the system may use MPC algorithms that include dynamic key refreshes (e.g., private key shares may be dynamically updated/modified at a given interval) and/or dynamic approval and/or signing policies. These dynamic policies are made possible by the online partial private key. Thus, the system introduces the enhanced security of dynamic systems, while still maintaining the security of offline systems (e.g., through the use of the offline partial private key).

Finally, the MPC-based key operations may use threshold key-signing policies in which only a threshold number of users (e.g., partial private keys corresponding to a user) are required. Upon determination by the system that the threshold is met, the system may allow a subsequent user (e.g., an online user) to finalize and perform a blockchain operation. As such, the system allows for the use of MPC-based key operations without requiring all parties to be online and/or available at the same time.

Figure 2:
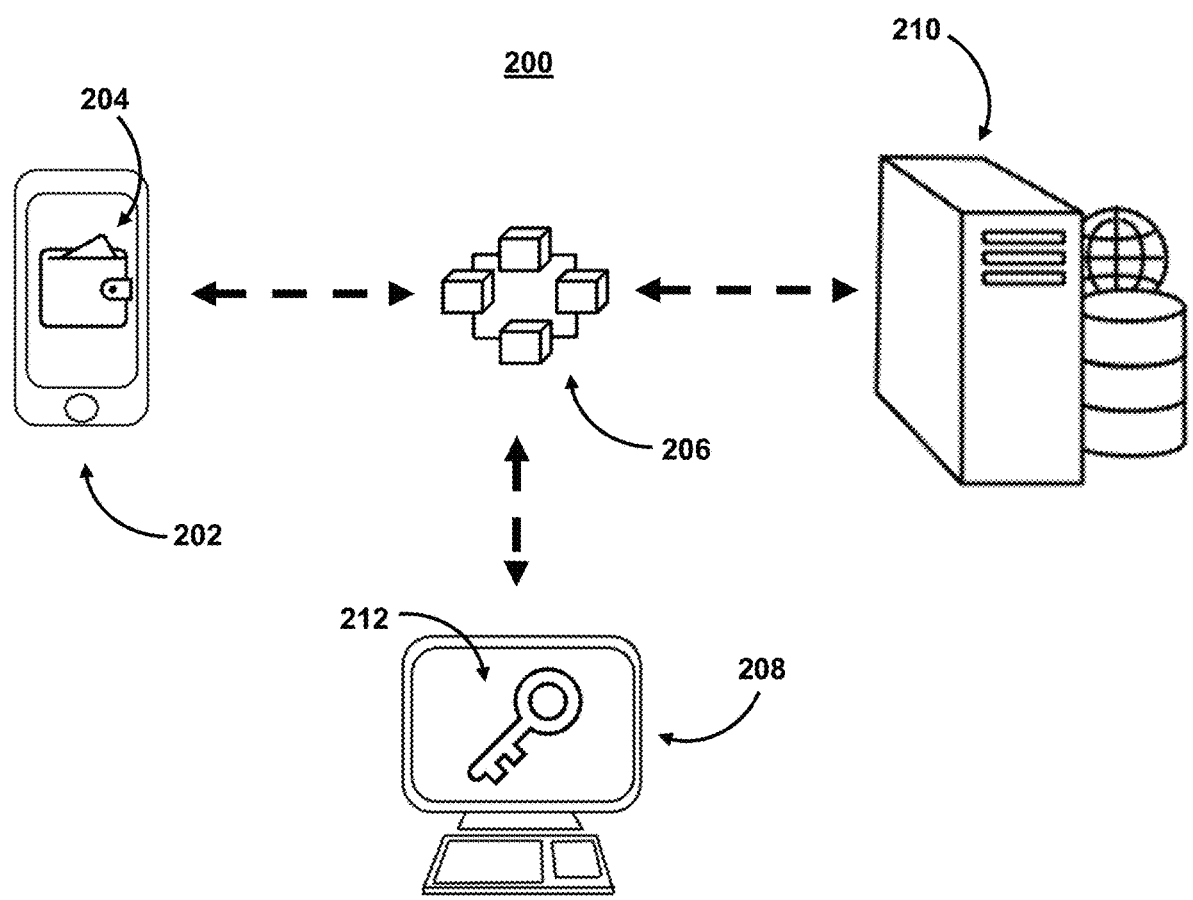
FIG. 2 shows an illustrative diagram for conducting blockchain operations, in accordance with one or more embodiments.

FIG. 2 shows an illustrative diagram for conducting blockchain operations, in accordance with one or more embodiments. For example, the diagram presents various components that may be used to manage partial private keys for cryptography-based, storage applications used in blockchain operations and/or facilitate secure authentication when conducting blockchain operations using cryptography-based, storage applications in some embodiments.

FIG. 2 includes user device 202. User device 202 may include a user interface. As referred to herein, a "user interface" may comprise a mechanism for human-computer interaction and communication in a device and may include display screens, keyboards, a mouse, and the appearance of a desktop. For example, a user interface may comprise a way a user interacts with an application or website in order to manage partial private keys for cryptography-based, storage applications used in blockchain operations and/or facilitate secure authentication when conducting blockchain operations using cryptography-based, storage applications, and the user interface may display content related to managing partial private keys for cryptography-based, storage applications used in blockchain operations and/or facilitating secure authentication when conducting blockchain operations using cryptography-based, storage applications. As referred to herein, "content" should be understood to mean an electronically consumable user asset, representations of goods or services (including nonfungible tokens), Internet content (e.g., streaming content, downloadable content, webcasts, etc.), video data, audio data, image data, and/or textual data, etc.

As shown in FIG. 2, system 200 may include multiple user devices (e.g., user device 202, user device 208, and/or user device 210). For example, system 200 may comprise a distributed state machine, in which each of the components in FIG. 2 acts as a client of system 200. For example, system 200 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system.

It should be noted that, while shown as a smartphone, a personal computer, and a server in FIG. 2, the user devices may be any type of computing device, including, but not limited to, a laptop computer, a tablet computer, a hand-held computer, and/or other computing equipment (e.g., a server), including "smart," wireless, wearable, and/or mobile devices. It should be noted that embodiments describing system 200 performing a blockchain operation may equally be applied to, and correspond to, an individual user device (e.g., user device 202, user device 208, and/or user device 210) performing the blockchain operation. That is, system 200 may correspond to the user devices (e.g., user device 202, user device 208, and/or user device 210) collectively or individually.

Each of the user devices may be used by the system to conduct blockchain operations and/or contribute to managing partial private keys for cryptography-based, storage applications used in blockchain operations and/or facilitating secure authentication when conducting blockchain operations using cryptography-based, storage applications. As referred to herein, "blockchain operations" may comprise any operations including and/or related to blockchains and blockchain technology. For example, blockchain operations may include conducting transactions, querying a distributed ledger, generating additional blocks for a blockchain, transmitting communications-related nonfungible tokens, performing encryption/decryption, exchanging public/private keys, and/or other operations related to blockchains and blockchain technology. In some embodiments, a blockchain operation may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain operation may comprise the creation, modification, exchange, and/or review of a token (e.g., a digital asset-specific blockchain), including a nonfungible token. A nonfungible token may comprise a token that is associated with a good, a service, a smart contract, and/or other content that may be verified by, and stored using, blockchain technology.

In some embodiments, blockchain operations may also comprise actions related to mechanisms that facilitate other blockchain operations (e.g., actions related to metering activities for blockchain operations on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain operation (e.g., computation, data access, transaction, etc.). Each blockchain operation has a predetermined cost in units of gas (e.g., as determined based on a predefined set of rules for the system). When a blockchain operation triggers the execution of a smart contract, the blockchain operation may include an amount of gas that sets the upper limit of what can be consumed in running the smart contract. The system may terminate execution of the smart contract if the amount of gas consumed by computation exceeds the gas available in the blockchain operation. For example, in Ethereum, gas comprises a mechanism for allowing Turing-complete computation while limiting the resources that any smart contract and/or blockchain operation may consume.

In some embodiments, gas may be obtained as part of a blockchain operation (e.g., a purchase) using a network-specific cryptocurrency (e.g., ether in the case of Ethereum). The system may require gas (or the amount of the network-specific cryptocurrency corresponding to the required amount of gas) to be transmitted with the blockchain operation as an earmark to the blockchain operation. In some embodiments, gas that is earmarked for a blockchain operation may be refunded back to the originator of the blockchain operation if, after the computation is executed, an amount remains unused.

As shown in FIG. 2, one or more user devices may include a digital wallet (e.g., digital wallet 204) used to perform blockchain operations. For example, the digital wallet may comprise a repository that allows users to store, manage, and trade their cryptocurrencies and assets, interact with blockchains, and/or conduct blockchain operations using one or more applications. The digital wallet may be specific to a given blockchain protocol or may provide access to multiple blockchain protocols. In some embodiments, the system may use various types of wallets such as hot wallets and cold wallets. Hot wallets are connected to the internet while cold wallets are not. Most digital wallet holders hold both a hot wallet and a cold wallet. Hot wallets are most often used to perform blockchain operations, while a cold wallet is generally used for managing a user account and may have no connection to the internet.

As shown in FIG. 2, one or more user devices may include a private key (e.g., key 212) and/or digital signature. For example, system 200 may use cryptographic systems for conducting blockchain operations such as managing partial private keys for cryptography-based, storage applications used in blockchain operations and/or facilitating secure authentication when conducting blockchain operations using cryptography-based, storage applications. For example, system 200 may use public-key cryptography, which features a pair of digital keys (e.g., which may comprise strings of data). In such cases, each pair comprises a public key (e.g., which may be public) and a private key (e.g., which may be kept private). System 200 may generate the key pairs using cryptographic algorithms (e.g., featuring one-way functions). System 200 may then encrypt a message (or other blockchain operation) using an intended receiver's public key such that the encrypted message may be decrypted only with the receiver's corresponding private key. In some embodiments, system 200 may combine a message with a private key to create a digital signature on the message. For example, the digital signature may be used to verify the authenticity of blockchain operations. As an illustration, when conducting blockchain operations, system 200 may use the digital signature to prove to every node in the system that it is authorized to conduct the blockchain operations.

For example, system 200 may comprise a plurality of nodes for the blockchain network. Each node may correspond to a user device (e.g., user device 208). A node for a blockchain network may comprise an application or other software that records and/or monitors peer connections to other nodes and/or miners for the blockchain network. For example, a miner comprises a node in a blockchain network that facilitates blockchain operations by verifying blockchain operations on the blockchain, adding new blocks to the existing chain, and/or ensuring that these additions are accurate. The nodes may continually record the state of the blockchain and respond to remote procedure requests for information about the blockchain.

For example, user device 208 may request a blockchain operation (e.g., conduct a transaction). The blockchain operation may be authenticated by user device 208 and/or another node (e.g., a user device in the community network of system 200). For example, using cryptographic keys, system 200 may identify users and give access to their respective user accounts (e.g., corresponding digital wallets) within system 200. Using private keys (e.g., known only to the respective users) and public keys (e.g., known to the community network), system 200 may create digital signatures to authenticate the users.

Following an authentication of the blockchain operation (e.g., using key 212), the blockchain operation may be authorized. For example, after the blockchain operation is authenticated between the users, system 200 may authorize the blockchain operation prior to adding it to the blockchain. System 200 may add the blockchain operation to blockchain 206. System 200 may perform this based on a consensus of the user devices within system 200. For example, system 200 may rely on a majority (or other metric) of the nodes in the community network (e.g., user device 202, user device 208, and/or user device 210) to determine that the blockchain operation is valid. In response to validation of the block, a node user device (e.g., user device 202, user device 208, and/or user device 210) in the community network (e.g., a miner) may receive a reward (e.g., in a given cryptocurrency) as an incentive for validating the block.

To validate the blockchain operation, system 200 may use one or more validation protocols and/or validation mechanisms. For example, system 200 may use a proof-of-work mechanism in which a user device must provide evidence that it performed computational work to validate a blockchain operation and thus this mechanism provides a manner for achieving consensus in a decentralized manner as well as preventing fraudulent validations. For example, the proof-of-work mechanism may involve iterations of a hashing algorithm. The user device that is successful aggregates and records blockchain operations from a mempool (e.g., a collection of all valid blockchain operations waiting to be confirmed by the blockchain network) into the next block. Alternatively or additionally, system 200 may use a proof-of-stake mechanism in which a user account (e.g., corresponding to a node on the blockchain network) is required to have, or "stake," a predetermined amount of tokens in order for system 200 to recognize it as a validator in the blockchain network.

In response to validation of the block, the block is added to blockchain 206, and the blockchain operation is completed. For example, to add the blockchain operation to blockchain 206, the successful node (e.g., the successful miner) encapsulates the blockchain operation in a new block before transmitting the block throughout system 200.

Figure 3:
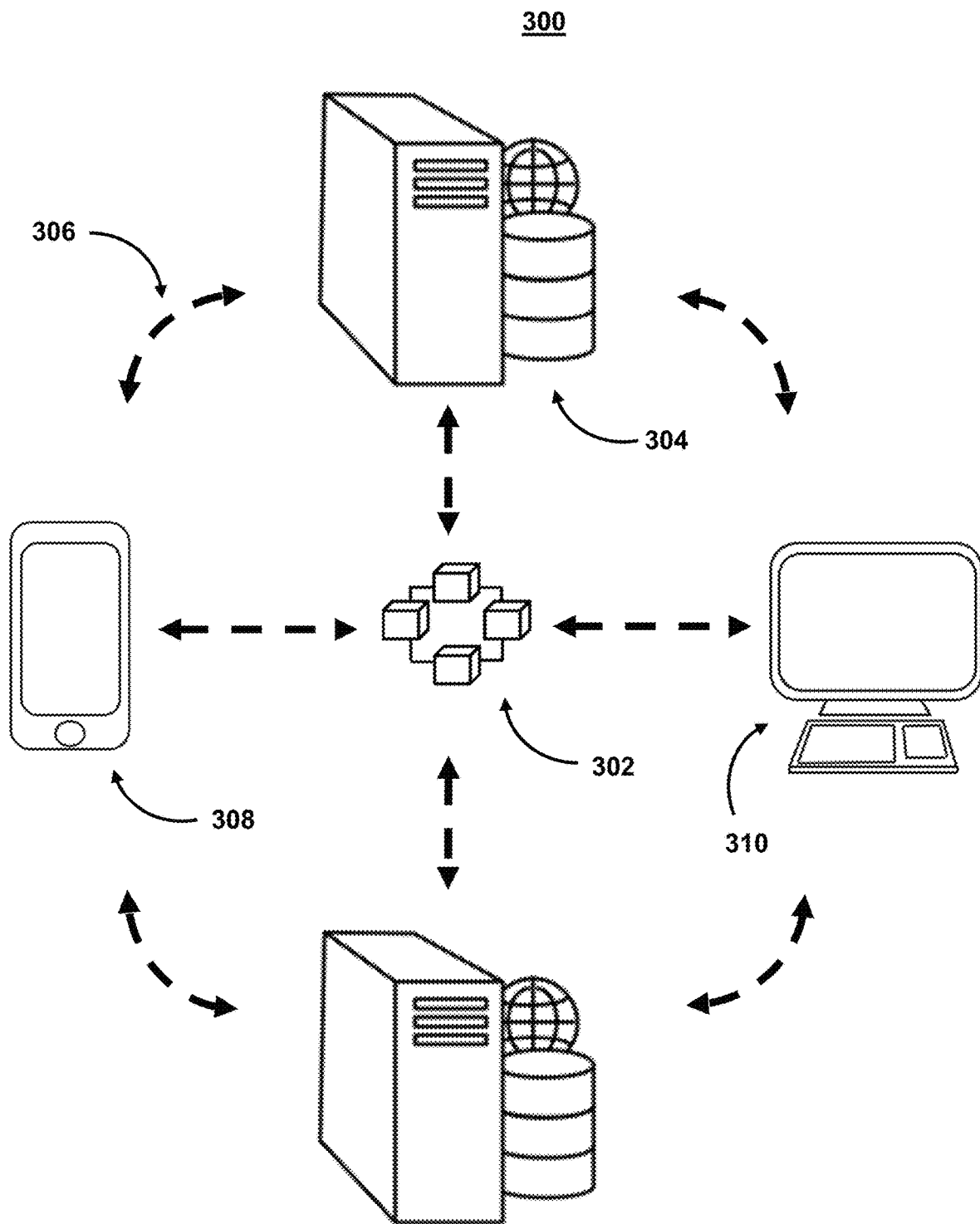
FIG. 3 shows an illustrative diagram for a decentralized application, in accordance with one or more embodiments.

FIG. 3 shows an illustrative diagram for a decentralized application, in accordance with one or more embodiments. For example, in some embodiments, system 300 may manage partial private keys for cryptography-based, storage applications used in blockchain operations and/or facilitate secure authentication when conducting blockchain operations using cryptography-based, storage applications within a decentralized application environment. A decentralized application may comprise an application that exists on a blockchain (e.g., blockchain 302) and/or a peer-to-peer network (e.g., network 306). That is, a decentralized application may comprise an application that has a back end that is in part powered by a decentralized peer-to-peer network such as a decentralized, open-source blockchain with smart contract functionality.

For example, network 306 may allow user devices (e.g., user device 304) within network 306 to share files and access. In particular, the peer-to-peer architecture of network 306 allows blockchain operations (e.g., corresponding to blockchain 302) to be conducted between the user devices in the network, without the need of any intermediaries or central authorities.

In some embodiments, the user devices of system 300 may comprise one or more cloud components. For example, cloud components may be implemented as a cloud computing system and may feature one or more component devices. It should also be noted that system 300 is not limited to four devices. Users may, for instance, utilize one or more devices to interact with one another, one or more servers, or other components of system 300. It should be further noted that while one or more operations (e.g., blockchain operations) are described herein as being performed by a particular component (e.g., user device 304) of system 300, those operations may, in some embodiments, be performed by other components of system 300. As an example, while one or more operations are described herein as being performed by components of user device 304, those operations may, in some embodiments, be performed by one or more cloud components. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components (e.g., user device 304 and user device 308, respectively). Additionally, or alternatively, a single user (and/or a user account linked to a single user) may interact with system 300 and/or one or more components of system 300 using two different components (e.g., user device 304 and user device 308, respectively).

With respect to the components of system 300, each of these devices may receive content and data via input/output (hereinafter "I/O") paths using I/O circuitry. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both user device 308 and user device 310 include a display upon which to display data (e.g., content related to one or more blockchain operations).

Additionally, the devices in system 300 may run an application (or another suitable program). The application may cause the processors and/or control circuitry to perform operations related to managing partial private keys for cryptography-based, storage applications used in blockchain operations and/or facilitating secure authentication when conducting blockchain operations using cryptography-based, storage applications within a decentralized application environment.

Each of these devices may also include electronic storages. The electronic storages may include non-transitory storage media that electronically stores information. The electronic storage media of the electronic storages may include one or both of (i) system storage that is provided integrally (e.g., is substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disk, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes network 306, which may comprise communication paths between user devices. The communication paths may include the Internet, a mobile phone network, a mobile voice or data network (e.g., a 5G or LTE network), a cable network, a public switched telephone network, or other types of communication networks or combinations of communication networks. The communication paths may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Figure 4:
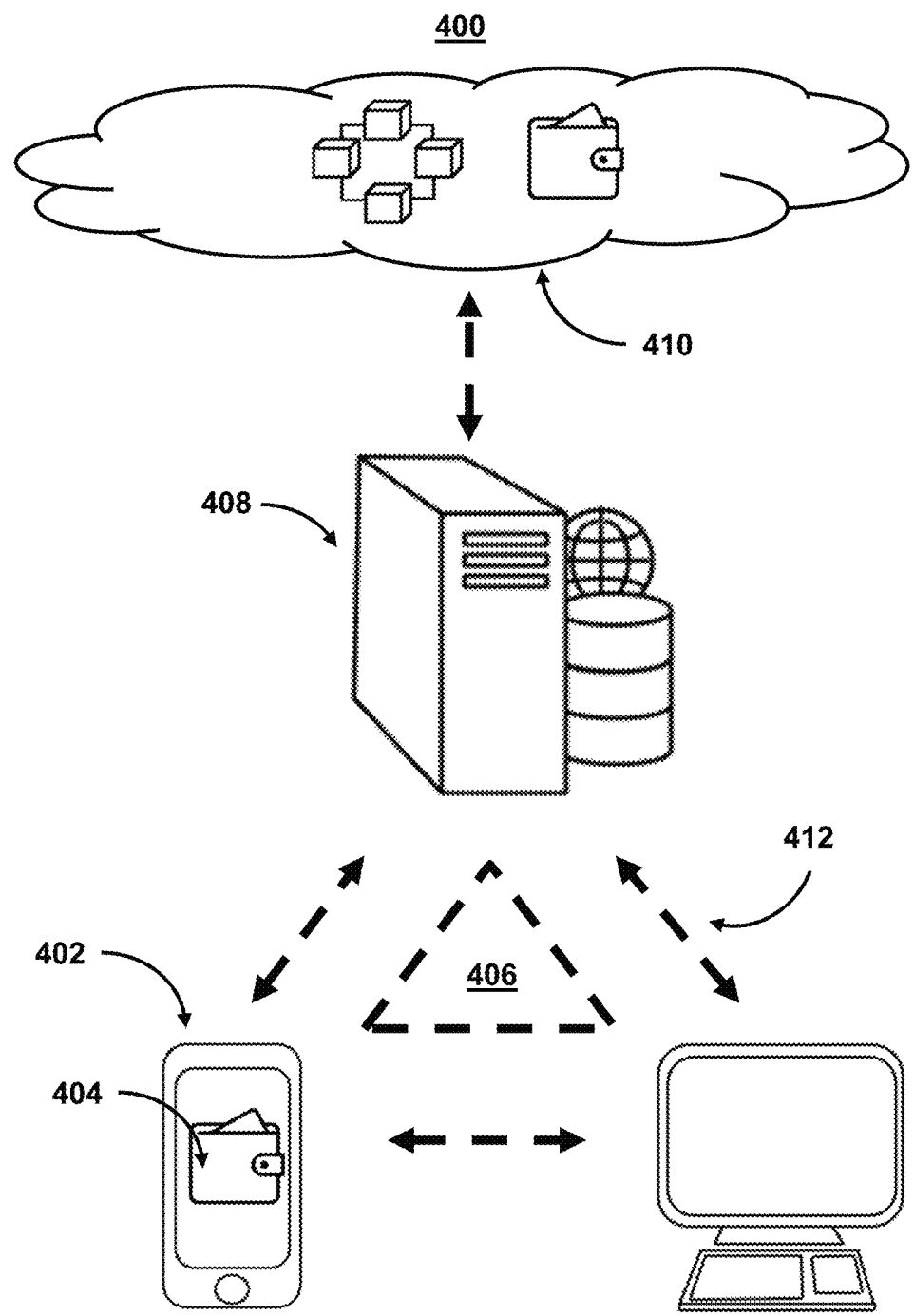
FIG. 4 shows an illustrative diagram for conducting operations in a decentralized application using blockchain operations, in accordance with one or more embodiments.

FIG. 4 shows an illustrative diagram for conducting operations in a decentralized application using blockchain operations, in accordance with one or more embodiments. For example, system 400 may include user device 402. Furthermore, user device 402 may comprise an application (e.g., application 404) that is implemented on, and/or accessible by, user device 402. For example, application 404 may interact with one or more other applications and/or application programming interfaces (APIs) in order to manage partial private keys for cryptography-based, storage applications used in blockchain operations and/or facilitate secure authentication when conducting blockchain operations using cryptography-based, storage applications. For example, application 404 may comprise a decentralized application digital wallet and/or wallet service that is able to sign and send transactions to transfer tokens and/or perform other blockchain operations as well as interact with one or more decentralized applications.

System 400 also includes API layer 406. In some embodiments, API layer 406 may be implemented on user device 402. Alternatively or additionally, API layer 406 may reside on one or more cloud components (e.g., server 408). For example, API layer 406 may reside on a server 408 and comprise a platform service for a custodial wallet service, decentralized application, etc. API layer 406 (which may be a REST or web services API layer) may provide a decoupled interface to data and/or functionality of one or more applications.

API layer 406 may provide various low-level and/or blockchain-specific operations in order to manage partial private keys for cryptography-based, storage applications used in blockchain operations and/or facilitate secure authentication when conducting blockchain operations using cryptography-based, storage applications. For example, API layer 406 may provide blockchain operations such as blockchain writes. Furthermore, API layer 406 may perform a transfer validation ahead of forwarding the blockchain operation (e.g., a transaction) to another service (e.g., a crypto service). API layer 406 may then log the outcome. For example, by logging to the blockchain prior to forwarding, the API layer 406 may maintain internal records and balances without relying on external verification (e.g., which may take up to ten minutes based on blockchain updating activity).

API layer 406 may also provide informational reads. For example, API layer 406 (or a platform service powered by API layer 406) may generate blockchain operation logs and write to an additional ledger (e.g., an internal record and/or indexer service) the outcome of the reads. If this is done, a user accessing the information through other means may see consistent information such that downstream users ingest the same data point as the user.

API layer 406 may also provide a unified API to access balances, transaction histories, and/or other blockchain operations activity records between one or more decentralized applications and custodial user accounts. By doing so, the system maintains the security of sensitive information such as the balances and transaction history. Alternatively, a mechanism for maintaining such security would separate the API access between the decentralized applications and custodial user accounts through the use of special logic. The introduction of the special logic decreases the streamlining of the system, which may result in system errors based on divergence and reconciliation.

API layer 406 may provide a common, language-agnostic way of interacting with an application. In some embodiments, API layer 406 may comprise a web services API that offers a well-defined contract that describes the services in terms of their operations and the data types used to exchange information. REST APIs do not typically have this contract; instead, they are documented with client libraries for most common languages including Ruby, Java, PHP, and JavaScript. SOAP web services have traditionally been adopted in the enterprise for publishing internal services as well as for exchanging information with partners in business-to-business (B2B) transactions.

API layer 406 may use various architectural arrangements. For example, system 400 may be partially based on API layer 406, such that there is strong adoption of SOAP and RESTful web services, using resources such as Service Repository and Developer Portal, but with low governance, standardization, and separation of concerns. Alternatively, system 400 may be fully based on API layer 406, such that separation of concerns between layers such as API layer 406, services, and applications are in place.

In some embodiments, the system architecture may use a microservice approach. Such systems may use two types of layers: front-end layers and back-end layers, where microservices reside. In this kind of architecture, the role of the API layer 406 may be to provide integration between front-end and back-end layers. In such cases, API layer 406 may use RESTful APIs (exposition to front-end or even communication between microservices). API layer 406 may use the Advanced Message Queuing Protocol (AMQP), which is an open standard for passing business messages between applications or organizations. API layer 406 may use an open-source, high-performance remote procedure call (RPC) framework that may run in a decentralized application environment. In some embodiments, the system architecture may use an open API approach. In such cases, API layer 406 may use commercial or open-source API platforms and their modules. API layer 406 may use a developer portal. API layer 406 may use strong security constraints applying a web application firewall that protects the decentralized applications and/or API layer 406 against common web exploits, bots, and denial-of-service (DDoS) attacks. API layer 406 may use RESTful APIs as standard for external integration.

As shown in FIG. 4, system 400 may use API layer 406 to communicate with and/or facilitate blockchain operations with server 408. For example, server 408 may represent a custodial platform for blockchain operations. A custodial platform may manage private keys stored by a centralized service provider (e.g., server 408). In such cases, server 408 may interact with blockchain 410, a wallet service for blockchain 410, an indexer service for blockchain 410 (e.g., as described in FIG. 5), and/or other platform services.

For example, a wallet service may comprise an application and/or a software-based system that securely stores users' payment information, private keys, and/or passwords facilitating blockchain operations with websites, nodes, and/ or other devices. In some embodiments, a wallet service may also provide additional ledger access (e.g., a second ledger). Furthermore, as discussed above, this second ledger may receive updates directly from API layer 406, as opposed to relying on data pulled directly from blockchain 410.

For example, system 400 may maintain its records (e.g., both live and for accounting) in good order separate from balances on blockchain 410. That is, system 400 may maintain an architecture featuring the second ledger, where balances are stored and updated, and the logs of blockchain operations. While conventional systems may rely on directly referencing blockchain 410, since the blockchain is the source of truth for the system, however, such reliance leads to additional technical problems.

First, there is a strong likelihood of impedance mismatch between a format for a platform service and the APIs used to retrieve data from the blockchain (e.g., which may lead to accounting imbalances). For example, system 400 may need to be able to generate accounting entries reflecting changes of balances. However, while changes of balances can be tracked by examining blockchain 410, this requires additional processing and computational power.

Second, accounting changes in a blockchain architecture should be irreversible. This is achieved in practice for current blockchain operations by waiting for a variable number of confirmations from the blockchain (e.g., blockchain 410). By waiting for the variable number of confirmations, the likelihood of an error in the blockchain becomes infinitesimally small. However, while blockchain services rely on this methodology, this is not a rule inherent to the blockchain itself. That is, the blockchain does not have an inherent authentication mechanism that is dependent on a number of confirmations. Instead, the blockchain relies on an absolute system—blockchain operations are either recorded on a particular node or they are not.

As such, forks in the blockchain are always possible. In the case of a fork, system 400 may not follow the "right" fork for an undetermined amount of time. If that happens, and if, for the purpose of a custodial digital wallet, system 400 decides to move from one fork to another, system 400 may have a more straightforward mechanism to maintain an accurate history of a user account's positions if system 400 stores them independently from a given blockchain. Furthermore, in case of forks, system 400 performs some internal remediation on user accounts, which is enabled by system 400 maintaining a layer of insulation, from the blockchain, for remedial blockchain operations. For example, system 400 may have a separate storage, protected by the second ledger (e.g., a ledger service), for reads, and by a transfer service, for writes, that reflect the state of the blockchain that is relevant for system 400 purposes.

In some embodiments, the system may also use one or more Application Binary Interfaces (ABIs). An ABI is an interface between two program modules, often between operating systems and user programs. ABIs may be specific to a blockchain protocol. For example, an Ethereum Virtual Machine (EVM) is a core component of the Ethereum network, and a smart contract may be a piece of code stored on the Ethereum blockchain, which are executed on EVM. Smart contracts written in high-level languages like Solidity or Vyper may be compiled in EVM executable bytecode by the system. Upon deployment of the smart contract, the bytecode is stored on the blockchain and is associated with an address. To access functions defined in high-level languages, the system translates names and arguments into byte representations for byte code to work with it. To interpret the bytes sent in response, the system converts back to the tuple (e.g., a finite ordered list of elements) of return values defined in higher-level languages. Languages that compile for the EVM maintain strict conventions about these conversions, but in order to perform them, the system must maintain the precise names and types associated with the operations. The ABI documents these names and types precisely, and in an easily parsable format, doing translations between human-intended method calls and smart-contract operations discoverable and reliable.

For example, ABI defines the methods and structures used to interact with the binary contract similar to an API, but on a lower-level. The ABI indicates the caller of the function to encode (e.g., ABI encoding) the needed information like function signatures and variable declarations in a format that the EVM can understand to call that function in bytecode. ABI encoding may be automated by the system using compilers or wallets interacting with the blockchain.

Figure 5:
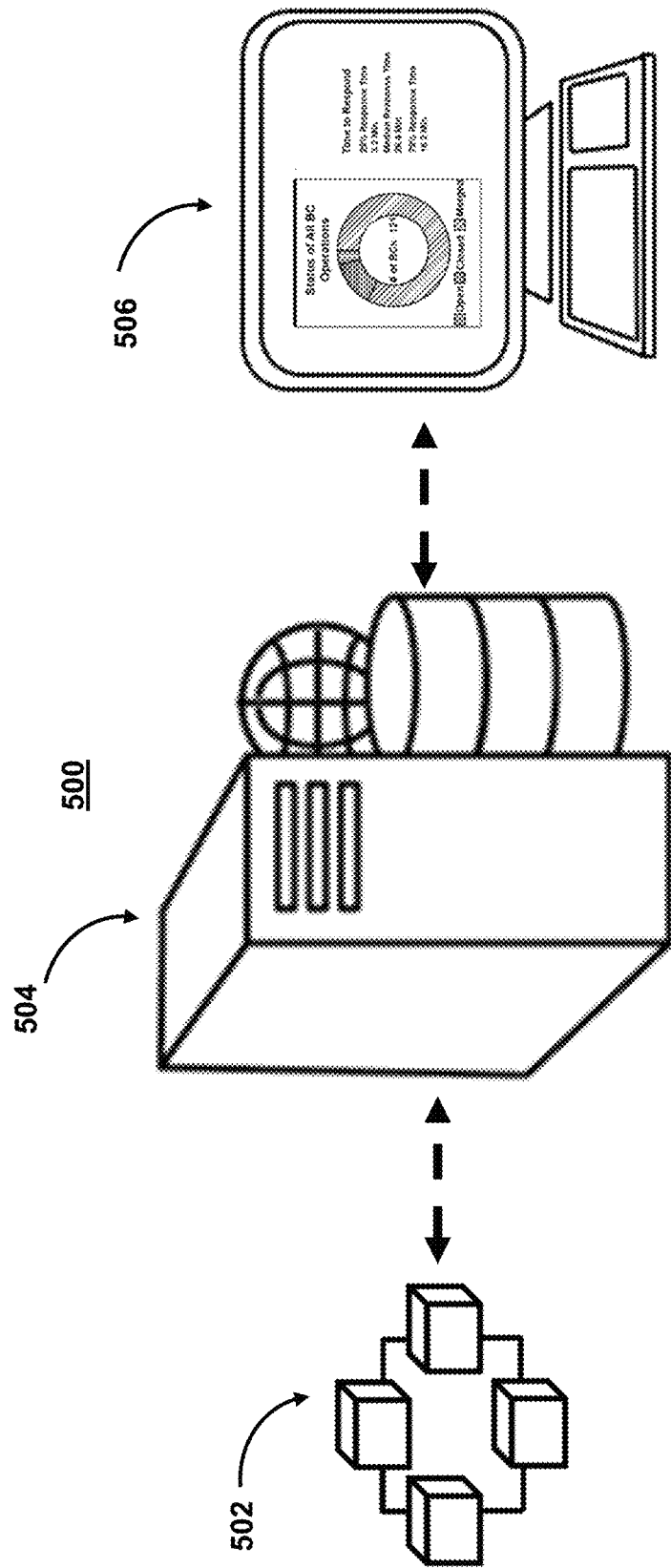
FIG. 5 shows an illustrative diagram for a blockchain indexer, in accordance with one or more embodiments.

FIG. 5 shows an illustrative diagram for a blockchain indexer, in accordance with one or more embodiments. For example, in some embodiments, the system may use indexer service 500 to manage partial private keys for cryptography-based, storage applications used in blockchain operations and/or facilitate secure authentication when conducting blockchain operations using cryptography-based, storage applications. Indexer service 500 may fetch raw data (e.g., data related to a current state and/or instance of blockchain 502) from a node of a blockchain network (e.g., as described above). Indexer service 500 may then process the data and store it in a database and/or data structure in an efficient way to provide quick access to the data. For example, indexer 504 may publish and/or record a subset of blockchain operations that occur for blockchain 502. Accordingly, for subsequent blockchain operations, indexer service 500 may reference the index at indexer 504 as opposed to a node of blockchain 502 to provide various services at user device 506.

For example, indexer 504 may store a predetermined list of blockchain operations to monitor for and/or record in an index. These may include blockchain operations (e.g., "operation included," "operation removed," "operation finalized") related to a given type of blockchain operation (e.g., "transaction," "external transfer," "internal transfer," "new contract metadata," "ownership change," etc.) as well as blockchain operations related to a given protocol, protocol subgroup, and/or other characteristic (e.g., "ETH," "ERC20," and/or "ERC721"). Additionally and/or alternatively, the various blockchain operations and metadata related to those blockchain operations (e.g., block designations, user accounts, time stamps, etc.) as well as an aggregate of multiple blockchain operations (e.g., total blockchain operations amounts, rates of blockchain operations, rate of blockchain updates, etc.) may be monitored and/or recorded.

Indexer 504 may likewise provide navigation and search features (e.g., support Boolean operations) for the indexed blockchain operations. In some embodiments, indexer 504 may apply one or more formatting protocols to generate representations of indexed blockchain operations in a human-readable format. In some embodiments, indexer 504 may also tag blockchain operations based on whether or not the blockchain operation originated for a local user account (e.g., a user account corresponding to a custodial account) and/or a locally hosted digital wallet. Indexer service 500 may determine whether a blockchain operation contains relevant information for users of indexer service 500 by storing information about whether an address is an internal address of indexer service 500 or one used in a digital wallet hosted by a predetermined wallet service.

Figure 6:
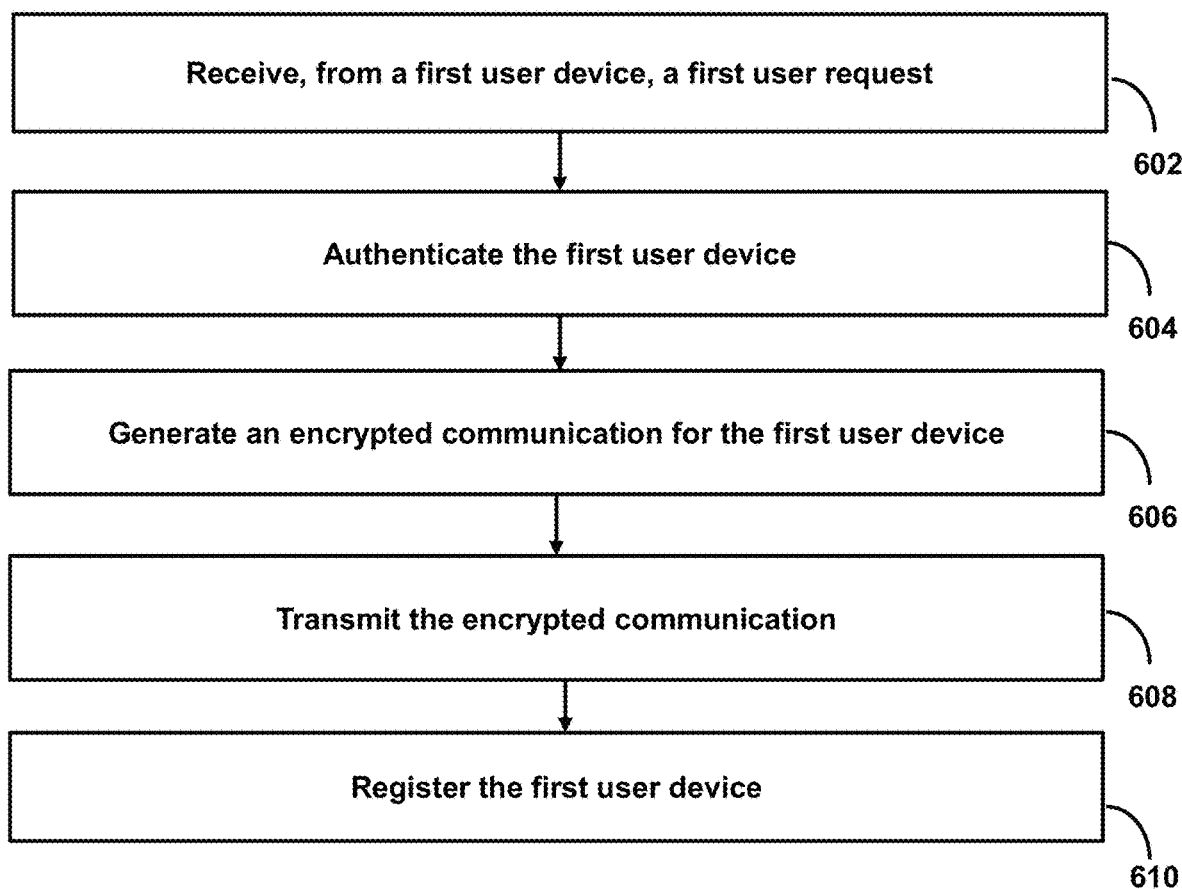
FIG. 6 shows a flowchart of the steps involved in managing partial private keys for cryptography-based, storage applications used in blockchain operations, in accordance with one or more embodiments.

FIG. 6 shows a flowchart of the steps involved for managing partial private keys for cryptography-based, storage applications used in blockchain operations, in accordance with one or more embodiments. For example, the system may use process 600 (e.g., as implemented on one or more system components described above) in order to allow a user to conduct blockchain operations in a secure manner with third-party decentralized applications.

At step 602, process 600 (e.g., using one or more components described above) may receive a first user request. For example, the system may receive, from a first user device, a first user request to access a first user account corresponding to a first cryptography-based, storage application. For example, a server may store one or more user accounts, including the first user account that corresponds to the first cryptography-based, storage application, and a platform service (e.g., hosted on the server) may receive, from the first user device, the first user request to access the first user account. In some embodiments, the platform service is not hosted on the server. In some embodiments, the first cryptography-based, storage application may be used to perform a plurality of blockchain operations across a computer network based on a combined use of a first public key, a first partial private key, and a second partial private key. In some embodiments, the second partial private key may not be accessible to a platform service facilitating the first cryptography-based storage application. For example, the server hosting the platform service may store the first partial private key and may not store the second partial private key. By doing so, the system may ensure that a user retains some autonomy in conduction blockchain operations and that the digital assets are secured.

In some embodiments, the system may generate the first partial key and the second partial key. For example, the system may receive a public key encryption for the first device. The system may then generate a ciphertext for the public key encryption. The system may split the private key encryption for the first device to generate the first partial key and the second partial key. By doing so, the partial private keys remain hidden even though they are used for the digital signing process.

For example, in some embodiments, the system may input to keys with public encryption for any device that is to be authorized for the first user account: $DK\_h1, \ldots, DK\_hn, DK\_s0$. The system may generate the following ciphertexts, which are encrypted user keys for each user device of the devices authorized for the first user account: $\{BK\_h\}\_DKh1, \ldots, \{BK\_h\}\_DKhn, \{BK\_h\}\_DK\_s0$. The system may then split each private key, using a 2-2 configuration and encrypt them with corresponding block keys. For example, if "t" individual signing keys are requested, the system generates the following ciphertexts "t" times: $\{k0\}\_BKh, \{k1\}\_BKs$. The system may then generate the following ciphertexts that contain encrypted Paillier secret keys for each user device block: $\{PSK\}\_BKh, \{PPK\}\_BKs$. During revocation, the approved device list may be updated by the system to exclude the revoked device's authentication key and the device's encrypted cosigner key $\{CK\_h\}\_DKi$ may be removed from the centralized datastore.

At step 604, process 600 (e.g., using one or more components described above) may authenticate the first user device. For example, the system may authenticate the first user device as corresponding to the first user account in response to receiving the first user request at a first remote device. For example, the platform service may authenticate the first user device as corresponding to the first user account in response to receiving the first user request.

At step 606, process 600 (e.g., using one or more components described above) may generate an encrypted communication for the first user device. For example, the system may, in response to authenticating the first user device, generate an encrypted communication for the first user device. For example, the encrypted communication may comprise instructions, that when executed by the first user device, causes the second partial private key to be stored on the first user device. As another example, the platform service may generate the encrypted communication for the first user device in response to authenticating the first user device.

In some embodiments, the system may generate the encrypted communication for the first user device based on a recovery key. For example, in some embodiments, the system may receive, from a second user device, a third user request to authorize the platform service to transmit the encrypted communication to the first user device. The system may query the second user device for a recovery key, wherein the recovery key corresponds to the first user account. The system may then determine to generate the encrypted communication based on the recovery key. For example, in some embodiments, the system may receive requests from other devices already associated with a user account and/or custodial cryptography-based storage application. As the devices are already authorized, the system may allow these devices to add other devices to the user account.

In some embodiments, the recovery key may not be compatible with the first public key and/or the first partial private key of the plurality of blockchain operations. For example, the system may have different rules and access restrictions for each partial private key. That is, despite each of the partial private keys corresponding to the user account, public key, and/or custodial cryptography-based, storage application, each partial private key may have different available roles. For example, a fast path to device recovery may be enabled, by the system, by setting up client-controlled external backup (e.g., on a cloud storage device) on another device. However, while the new device may be enrolled with the platform service and associated with the user account, the partial private key (e.g., the device key on the other device) may be designated as a recovery key. While the recovery key remains functionally equivalent to a device key, some rules around usage are added because the device key is portable and thus less secure. As such, this device key may be used to update device corresponding to a user account, but the system may prevent the device key for being used for other blockchain operations (e.g., transaction signing). This means that compromises of the client backups are insufficient to access digital assets.

In some embodiments, the system may generate the encrypted communication for the first user device by revoking access of a third user device. For example, the system may determine a third user device that currently has access to the first user account. The system may then revoke access of the third user device to the first user account. For example, the platform service may provide a new device key even if no recovery key exists. If a device is lost, without an existing recovery device, the system may cause the user account to enter a recovery mode. While the user account is in recovery mode, the new device enrollment proceeds using a newly generated recovery key to enroll the new device (and generate a new recovery key). Following the new device enrollment, the original recovery key and old device key are revoked. The system may accomplish this through a platform service with no key management operational intervention (e.g., without involving a private key for the blockchain wallet corresponding to the custodial cryptography-based, storage application).

In some embodiments, the system may generate the encrypted communication for the first user device based on a threshold number of a plurality of user devices providing authorization. For example, the system may determine a plurality of user devices that currently have recovery rights for the first user account. The system may query the plurality of user devices for authorization to generate the encrypted communication. The system may then determine whether a threshold number of the plurality of user devices provided authorization to generate the encrypted communication. For example, the system may contact a cohort of devices that may have recovery rights for the user account. In some embodiments, the system may further determine the plurality of user devices based on a social-graph connectivity of the plurality of user devices to the first user device. For example, the system may determine whether or not a threshold number of social media connections approve of the authorization. Alternatively or additionally, the system may use the social-graph connectivity to determine other devices corresponding to the user. For example, the system may break a recovery key into threshold shares and distribute the shares among trusted individuals. In this recovery scenario, the system may receive a request from the user confirming that user's device is lost (e.g., out-of-band). The system may send a message to the plurality of users indicating that the user is attempting to recover the account and a service prompts individuals to approve and provide the recovery shares. When combined, the recovery key is reconstructed and the account proceeds normally.

In some embodiments, the system may generate the encrypted communication for the first user device based on a threshold time difference. For example, the system may determine a first time at which the first user request was received. Additionally, the system may determine a current time. The system may then determine a difference between the first time and the current time. For example, the system may determine whether the different meets a threshold time difference. For example, in some embodiments, the system may wait a threshold amount of time before generating a recovery key and/or allowing a new user device to be associated with the first user device. By waiting the threshold amount of time, the system enhances security and reduces the likelihood of an unauthorized, cyberattack. In some embodiments, the system may dynamically adjust the threshold time difference. For example, the system may maintain user profile information about the user account, information about current network conditions, and/or use other characteristics to set the threshold time difference.

In some embodiments, the system may generate the encrypted communication for the first user device based on whether a number of user devices meets a threshold number of user devices. For example, the system may determine a number of user devices currently authorized to access the first user account. In some embodiments, the system may retrieve a threshold number of user devices, and the threshold number of devices may correspond to a maximum number of user devices that may be authorized for a single user account. The system may then determine whether the number of user devices meets a threshold number of user devices.

At step 608, process 600 (e.g., using one or more components described above) may transmit the encrypted communication. For example, the system may transmit the encrypted communication to the first user device. For example, the platform service may transmit the encrypted communication to the first user device.

At step 610, process 600 (e.g., using one or more components described above) may register the first user device. For example, the system may register, at the platform service, the first user device as corresponding to the first user account. For example, the platform service may register the first user device based on the transmitted encrypted communication.

In some embodiments, the system may perform a blockchain operation. For example, the system may receive, from the first user device, a second request to perform a blockchain operation corresponding to the first public key. The system may then retrieve, from the first user account, the first partial private key and a first user address. In some embodiments, the system may query the first user device for use of the second partial private key in performing the blockchain operation. In some embodiments, the system may generate a first digital signature based on the first partial private key and the second partial private key. The system may then perform the blockchain operation based on the first digital signature and the first user address.

The system may use the combination of the public key, the first partial key, and the second partial key to perform blockchain operations. For example, the system may use a user account that corresponds to an account for the blockchain platform service. As opposed to a non-custodial cryptography-based, storage application, which may correspond to a user without a third-party intermediary, the user account may correspond to a third-party intermediary (e.g., the platform service). By having a user account that corresponds to the platform service that is separate and distinct from a non-custodial cryptography-based, storage application, the system may provide additional features that would not be possible with conventional blockchain operations. For example, the system may augment and/or modify blockchain operations prior to completion in order to prevent fraud, verify user intent, and/or otherwise increase security. Additionally or alternatively, by having a user account that corresponds to the platform service that is separate and distinct from a non-custodial cryptography-based, storage application, the system may provide a single user to access multiple custodial cryptography-based, storage applications using a single account for the platform service.

In some embodiments, the system may cause a private key to be used in signing a block of data. For example, the instructions may cause a private key to be used in signing a block of data or verifying a signed block within a secure enclave. The system may use a Key Management service to operate a recovery service. The recovery service may export encryption public keys and user device recovery keys that are encrypted by the user device using public key encrypting and have the ciphertext is durably stored. The recovery keys can be decrypted within a secure enclave (e.g., a hardware-based key manager that are isolated from the main processor to provide an extra layer of security) and re-encrypted to the new device's encryption key when recovery mode is triggered.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 6.

Figure 7:
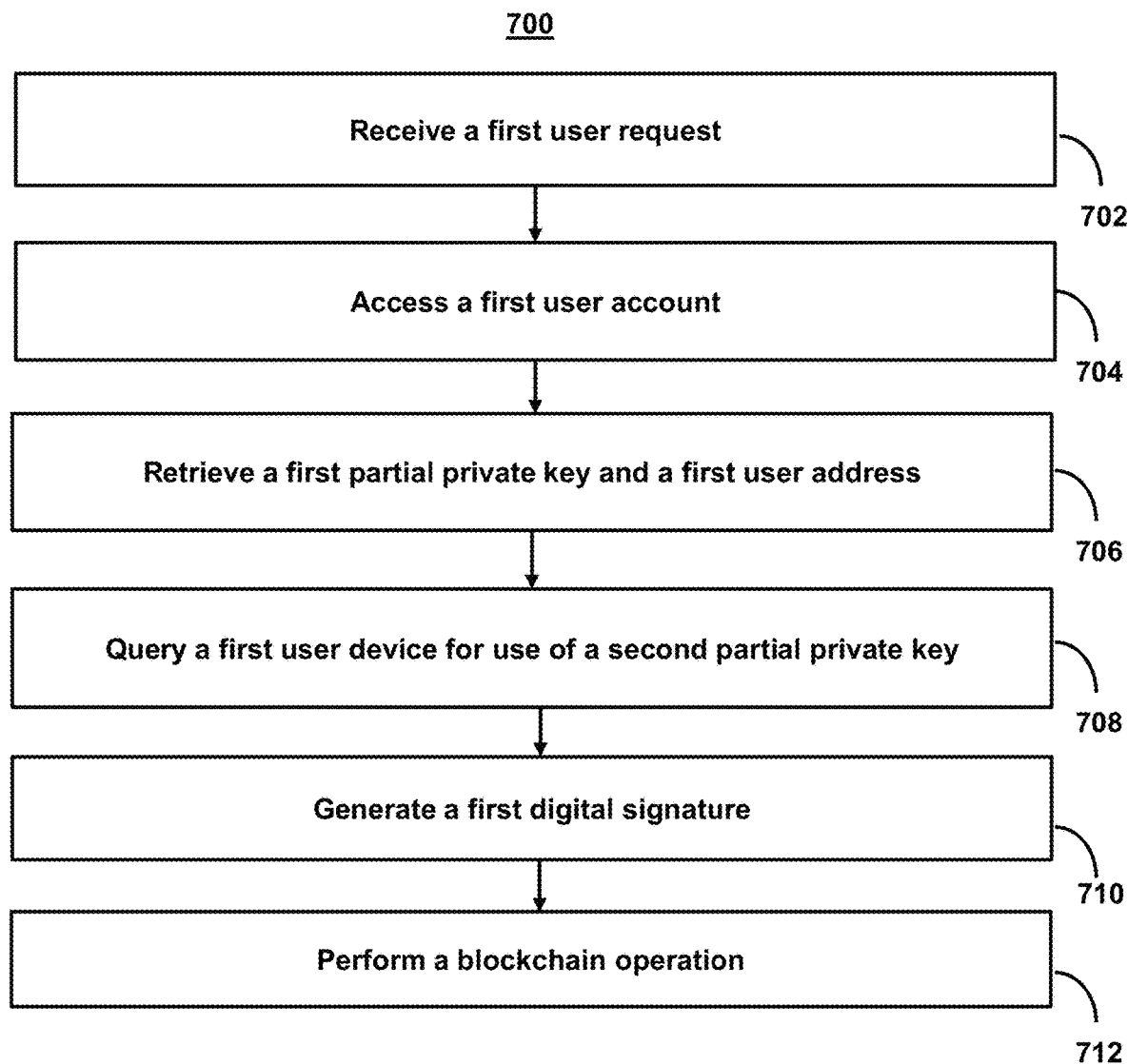
FIG. 7 shows a flowchart of the steps involved in facilitating secure authentication when conducting blockchain operations using cryptography-based, storage applications, in accordance with one or more embodiments.

FIG. 7 shows a flowchart of the steps involved in facilitating secure authentication when conducting blockchain operations using cryptography-based, storage applications, in accordance with one or more embodiments. For example, the system may use process 700 (e.g., as implemented on one or more system components described above) in order to conduct blockchain operations without risking information becoming public or subject to a cyber-attack. For example, a cryptography-based digital repository or a cryptography-based, storage application may refer to a digital wallet. A digital wallet may comprise a software based-system that securely (and typically in an encrypted format) stores users' confidential information, personal information, payment information, and/or passwords for numerous payment methods and websites. By using a digital wallet, users can complete communications, purchases, and or other blockchain operations easily and securely without risking the information becoming public or subject to a cyber-attack.

At step 702, process 700 (e.g., using one or more components described above) may receive a first user request. For example, the system may receive, from a decentralized application browser implemented on a first user device, a first user request. In some embodiments, the first user request may be a request to perform a blockchain operation corresponding to a first public key. For example, the decentralized application browser may receive user requests for performing a plurality of blockchain operations across a computer network. In some embodiments, an application programming interface ("API") implemented on a first remote device may receive the first user request (e.g., from the decentralized application browser) to perform the blockchain operation corresponding to the first public key.

In some embodiments, receiving the first user request may comprise receiving the current state of a blockchain. For example, the system may receive from a second remote device, a current state of a blockchain corresponding to the blockchain operation. The system may determine a characteristic of the blockchain operation based on the current state. The system may then query the first user device for confirmation of the blockchain operation based on the characteristic. In some embodiments, the system may receive a second user request confirming a performance of the blockchain operation based on the characteristic.

For example, the system may access a blockchain indexer and/or a blockchain estimation service in order to generate a characteristic (e.g., a transaction price, smart contract term, etc.) for the blockchain operation. The system may then generate a request to the user device to confirm the blockchain operations according to the characteristic.

At step 704, process 700 (e.g., using one or more components described above) may access a first user account. For example, the system may, in response to receiving the first user request, access via an API implemented on a first remote device, a first user account. In some embodiments, the first user account may correspond to the first public key, wherein a first cryptography-based, storage application corresponding to the first user account is accessible to the first remote device. For example, in some embodiments, the first cryptography-based, storage application corresponding to the first user account may be accessible to the first remote device through a platform application. In some embodiments, the first cryptography-based storage application may be used to perform a plurality of blockchain operations.

For example, a custodial cryptography-based, storage application may be a cryptography-based, storage application that is managed by a third-party exchange. For example, the custodial cryptography-based, storage application may be a platform cryptography-based, storage application such that the custodial cryptography-based, storage application is managed by a blockchain platform service. For custodial cryptography-based, storage applications, an exchange (e.g., the blockchain platform service) may store and manage keys (e.g., private keys) corresponding to a user account (e.g., corresponding to a blockchain address). The exchange may be tasked with securely storing funds (e.g., cryptocurrencies) and/or facilitating blockchain operations based on the funds. In some embodiments, the custodial cryptography-based, storage application may be a cold storage hardware wallet. In such cases, the funds may be stored securely on designated hardware in order to provide additional security. Alternatively, some embodiments may use a non-custodial cryptography-based, storage application, which may be browser-based (e.g., software installed on mobile devices).

At step 706, process 700 (e.g., using one or more components described above) may retrieve a first partial private key and a first user address. For example, the system may retrieve from the first user account, a first partial private key and a first user address. For example, the API may retrieve the first partial private key and a first user address from the first user account.

For example, the system may use a user account that corresponds to an account for the blockchain platform service. For example, as opposed to a non-custodial cryptography-based, storage application, which may correspond to a user without a third-party intermediary, the user account may correspond to a third-party intermediary (e.g., the platform service). By having a user account that corresponds to the platform service that is separate and distinct from a non-custodial cryptography-based, storage application, the system may provide additional features that would not be possible with conventional blockchain operations. For example, the system may augment and/or modify blockchain operations prior to completion in order to prevent fraud, verify user intent, and/or otherwise increase security. Additionally or alternatively, by having a user account that corresponds to the platform service that is separate and distinct from a non-custodial cryptography-based, storage application, the system may provide a single user to access multiple custodial cryptography-based, storage applications using a single account for the platform service.

As another example, a user address may correspond to a non-custodial cryptography-based, storage application assigned by a blockchain. The non-custodial wallet may correspond to a private and/or public key that allows blockchain operations to be perform using funds and/or information in the non-custodial wallet.

At step 708, process 700 (e.g., using one or more components described above) may query a first user device for use of a second partial private key. For example, the system may query the first user device for use of a second partial private key in performing the blockchain operation. In some embodiments, the second partial private key may be stored on the first user device. As an example, the API may query the first user device for use of a second partial private key in performing the blockchain operation. The API may send a request to the decentralized application browser (e.g., implemented on the first user device) to access the second partial private key that is stored on the first user device.

For example, the system may query the first user device for use of its partial private key. For example, in order to maintain security, neither the first user device nor the first remote device may share their respective partial private keys. However, both devices may still be required to use their partial private keys in order to perform the blockchain operation. To accomplish this, the system may use a Schnorr signature algorithm, Elliptic Curve Digital Signature Algorithm (ECDSA), Digital Signature Algorithm (DSA), and/or other suitable algorithm. For example, the key-signing session may involve the setting of one or more parameters as well as a hash function.

For example, a threshold signature scheme may generate both a secret key, s, during key generation as well as the random nonce, k, for each signing operation. In such cases, a key-signing session may require a minimum of four rounds for each signing operation (e.g., assuming no round results in an error). For example, the system may use three rounds to obtain k, and the system may use one round to distribute signature shares and compute the group signature.

In some embodiments, a key-signing session may be established between the first user device and the first remote device. For example, querying the first user device for the use of the second partial private key may comprise the system establishing a key-signing session between the first user device and the first remote device. In some embodiments, during the key-signing session, the system may generate a random nonce value based on the first partial private key and the second partial private key, where the random nonce value is not shared with the first user device or the first remote device.

For example, the key-signing session may involve the setting of one or more parameters as well as a hash function. The system may also select a nonce value. The nonce may be an arbitrary number that can be used once in a cryptographic communication. The system may determine the nonce to be a random or pseudo-random number. The nonce value may be select by the system based on an authentication protocol to ensure that previous blockchain operations (and/or communications containing them) cannot be reused. The system may also use the nonce value to initialize vectors for a hash function. For example, the system may select a nonce value to adjust the level of difficult (e.g., the amount of work required) in a proof-of-work system.

At step 710, process 700 (e.g., using one or more components described above) may generate a first digital signature. For example, the system may generate a first digital signature based on the first partial private key and the second partial private key. For example, in some embodiments, the API may generate the first digital signature based on the first partial private key and the second partial private key.

For example, in some embodiments, the first digital signature may be based on a plurality of parameters. For example, the system may determine a first parameter comprising 32 bytes, determine a second parameter comprising 32 bytes, and determine a third parameter comprising 1 byte. The system may determine the parameters based on a blockchain protocol and/or a given standard. Additionally or alternatively, the system may select a given parameter (e.g., a number of bytes comprising the digital signature) if the protocol allows the customization. The system may increase the number of bytes in the digital signature to increase security.

In some embodiments, the first digital signature may be based on a first user device characteristic. For example, the system may determine a characteristic of the first user device. In some embodiments, the system may select a signature scheme for the first digital signature based on the characteristic. For example, in some embodiments, the system may select a signature scheme based on the processing power and/or geographic location of the first user device. For example, some devices may suffer from low processing power and/or low connectivity. As such, the system may determine a characteristic of a user device and select a signature scheme based on the characteristic. For example, the system may select a Flexible Round-Optimized Schnorr Threshold Signatures (FROST) protocol, which may use a uses a two-round Distributed Key Generation (DKG) protocol to generate the nonce required for the signature.

At step 712, process 700 (e.g., using one or more components described above) may perform a blockchain operation. For example, the system may perform the blockchain operation based on the first digital signature and the first user address. For example, the API may perform the blockchain operation based on the first digital signature and the first user address. In some embodiments, a platform application (e.g., a blockchain platform service) may access a blockchain indexing service to perform the blockchain operation.

In some embodiments, performing the blockchain operation may comprise generating a modified blockchain operation. For example, in some embodiments, the system may perform the blockchain operation based on the first digital signature and the first user address by generating a modified blockchain operation based on the first user address. In some embodiments, the system may transmit the modified blockchain operation to the first cryptography-based, storage application. For example, the system may determine a user address (e.g., corresponding to an account in a blockchain distributed ledger) that allows blockchain operations to be performed using funds and/or information in corresponding to the user address. The system may determine that a given user account (e.g., managed by platform services) may correspond to a given user address. However, in order to facilitate additional features, the system may act as an intermediary. As part of this intermediary behavior, the system may modify blockchain operations to refer from a user account to a user address.

In some embodiments, performing the blockchain operation may be based on a risk likelihood. For example, the system may perform the blockchain operation based on the first digital signature and the first user address by first determining a risk likelihood for the blockchain operation. The system may then generate a modified blockchain operation based on the risk-likelihood. In some embodiments, the system may transmit the modified blockchain operation to the first cryptography-based, storage application. In some embodiments, the modified blockchain operation causes the first cryptography-based, storage application to transmit a warning to the first user device.

For example, the system may facilitate additional features by acting as an intermediary between a custodial cryptography-based, storage application and a non-custodial cryptography-based, storage application. An example of these features may be to determine a risk likelihood. For example, the risk likelihood may be a qualitative or quantitative metric for the likelihood of a given outcome for a blockchain operation. For example, the system may determine whether or not a blockchain operation is being performed with a banned address. In another example, the system may ensure that the blockchain operation is within a predetermined rule set (e.g., based on one or more regulatory body rulings). In yet another example, the system may determine whether or not a blockchain operation has a likelihood of being completed.

In some embodiments, performing the blockchain operation may comprise determining a banned address. For example, the system may perform the blockchain operation based on the first digital signature and the first user address based on determining a second user address corresponding to the blockchain operation. In some embodiments, the system may determine that the second user address corresponds to a banned address. The system may then transmit an error message for the blockchain operation to the first user device in response to determining that the second user address corresponds to the banned address. Additionally or alternatively, the system may generate a modified blockchain operation based on determining that the second user address corresponds to the banned address. In some embodiments, the modified blockchain operation comprises metadata corresponding to a read operation, where the read operation is performed by a blockchain indexing service.

For example, the read operation may cause the system to return tax, location, and/or other information corresponding to an address. In some embodiments, the system may prevent the blockchain operation from occurring. Alternatively, the system may generate a warning or other information (e.g., information relating to the rationale for generating the warning) and transmit the generated information to the user device.

In some embodiments, the system may receive a third user request. For example, in some embodiments, the system may receive a third user request from the first user device. For example, the third user request may request access to the second partial private key. The system may then perform a device authentication for the third user request. In some embodiments, the system may transmit data for the second partial private key to the first user device. The system may provide a cold storage mechanism for storing a partial private key for a user device and/or providing a mechanism for accessing the partial private key for the user device.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

A1. A method, the method comprising: receiving, from a first user device, a first user request to access a first user account corresponding to a first cryptography-based, storage application, wherein the first cryptography-based, storage application is used to perform a plurality of blockchain operations across a computer network based on a combined use of a first public key, a first partial private key, and a second partial private key, and wherein the second partial private key is not accessible to a platform service facilitating the first cryptography-based, storage application; in response to receiving the first user request, authenticating, at a first remote device, the first user device as corresponding to the first user account; in response to authenticating the first user device, generating an encrypted communication for the first user device, wherein the encrypted communication comprises instructions, that when executed by the first user device, causes the second partial private key to be stored on the first user device; transmitting the encrypted communication to the first user device; and registering, at the platform service, the first user device as corresponding to the first user account.

A2. The method of embodiment A1, further comprising: receiving, from the first user device, a second request to perform a blockchain operation corresponding to the first public key; retrieving, from the first user account, the first partial private key and a first user address; querying the first user device for use of the second partial private key in performing the blockchain operation; generating a first digital signature based on the first partial private key and the second partial private key; and performing the blockchain operation based on the first digital signature and the first user address.

A3. The method of any embodiments A1-A2, wherein generating the encrypted communication for the first user device comprises: receiving, from a second user device, a third user request to authorize the platform service to transmit the encrypted communication to the first user device; querying the second user device for a recovery key, wherein the recovery key corresponds to the first user account; determining to generate the encrypted communication based on the recovery key.

A4. The method of any embodiments A1-A3, wherein the recovery key is not compatible with the first public key and the first partial private key of the plurality of blockchain operations.

A5. The method of any embodiments A1-A4, wherein generating the encrypted communication for the first user device comprises: determining a third user device that currently has access to the first user account; and revoking access of the third user device to the first user account.

A6. The method of any embodiments A1-A5, wherein generating the encrypted communication for the first user device comprises: determining a plurality of user devices that currently have recovery rights for the first user account; querying the plurality of user devices for authorization to generate the encrypted communication; and determining whether a threshold number of the plurality of user devices provided authorization to generate the encrypted communication.

A7. The method of any embodiments A1-A6, wherein generating the encrypted communication for the first user device comprises: determining a first time at which the first user request was received; determining a current time; determining a difference between the first time and the current time; and determining whether the difference meets a threshold time difference.

A8. The method of any embodiments A1-A7, wherein generating the encrypted communication for the first user device comprises: determining a number of user devices currently authorized to access the first user account; retrieving a threshold number of user devices, wherein the threshold number of devices corresponds to a maximum number of user devices that may be authorized for a single user account; and determining whether the number of user devices meets a threshold number of user devices.

A9. The method of any embodiments A1-A8, wherein the instructions cause a private key to be used in signing a block of data or verifying a signed block within a secure enclave.

A10. The method of any embodiments A1-A9, wherein the first partial key and the second partial key are generated by: receiving a public key encryption for the first device; generating a ciphertext for the public key encryption; and splitting the private key encryption for the first device to generate the first partial key and the second partial key.

B1. A method, the method comprising: receiving, from a decentralized application browser implemented on a first user device, a first user request to perform a blockchain operation corresponding to a first public key; in response to receiving the first user request, accessing, via an application programming interface ("API") implemented on a first remote device, a first user account corresponding to the first public key, wherein a first cryptography-based, storage application corresponding to the first user account is accessible to the first remote device; retrieving, from the first user account, a first partial private key and a first user address; querying the first user device for use of a second partial private key in performing the blockchain operation, wherein the second partial private key is stored on the first user device; generating a first digital signature based on the first partial private key and the second partial private key; and performing the blockchain operation based on the first digital signature and the first user address.

B2. The method of embodiment B1, wherein querying the first user device for the use of the second partial private key comprises establishing a key-signing session between the first user device and the first remote device, wherein during the key-signing session a random nonce value is generated based on the first partial private key and the second partial private key, and wherein the random nonce value is not shared with the first user device or the first remote device.

B3. The method of any of embodiments B1-B2, wherein performing the blockchain operation based on the first digital signature and the first user address comprises: generating a modified blockchain operation based on the first user address; and transmitting the modified blockchain operation to the first cryptography-based, storage application.

B4. The method of any of embodiments B1-B3, further comprising: determining a characteristic of the first user device; and selecting a signature scheme for the first digital signature based on the characteristic.

B5. The method of any of embodiments B1-B4, wherein performing the blockchain operation based on the first digital signature and the first user address comprises: determining a risk likelihood for the blockchain operation; generating a modified blockchain operation based on the risk likelihood; and transmitting the modified blockchain operation to the first cryptography-based, storage application, wherein the modified blockchain operation causes the first cryptography-based, storage application to transmit a warning to the first user device.

B6. The method of any embodiments B1-B5, wherein performing the blockchain operation based on the first digital signature and the first user address comprises: determining a second user address corresponding to the blockchain operation; determining that the second user address corresponds to a banned address; and transmitting an error message for the blockchain operation to the first user device in response to determining that the second user address corresponds to the banned address.

B7. The method of any embodiments B1-B6, wherein performing the blockchain operation based on the first digital signature and the first user address comprises: determining a second user address corresponding to the blockchain operation; determining that the second user address corresponds to a banned address; and generating a modified blockchain operation based on determining that the second user address corresponds to the banned address, wherein the modified blockchain operation comprises metadata corresponding to a read operation, and wherein the read operation is performed by a blockchain indexing service.

B8. The method of any embodiments B1-B7, wherein generating the first digital signature based on the first partial private key and the second partial private key comprises: determining a first parameter comprising 32 bytes; determining a second parameter comprising 32 bytes; and determining a third parameter comprising 1 byte.

B9. The method of any embodiments B1-B8, wherein receiving the first user request to perform the blockchain operation comprises: receiving, from a second remote device, a current state of a blockchain corresponding to the blockchain operation; determining a characteristic of the blockchain operation based on the current state; querying the first user device for confirmation of the blockchain operation based on the characteristic; and receiving a second user request confirming a performance of the blockchain operation based on the characteristic.

B10. The method of any embodiments B1-B9, further comprising: receiving a third user request from the first user device, wherein the third user request requests access to the second partial private key; performing a device authentication for the third user request; and transmitting data for the second partial private key to the first user device.

C1. A tangible, non-transitory, machine-readable medium storing instructions that, when executed by a data processing apparatus, cause the data processing apparatus to perform operations comprising those of any of embodiments A1-A10 or B1-B10.

C2. A system comprising one or more processors; and memory storing instructions that, when executed by the processors, cause the processors to effectuate operations comprising those of any of embodiments A1-A10 or B1-B10.

C3. A system comprising means for performing any of embodiments A1-A10 or B1-B10.

What is claimed is:

1. A system for managing partial private keys for cryptography-based, storage applications used in blockchain operations, the system comprising:
one or more processors and non-transitory media storing instructions that, when executed by the one or more processors, cause operations comprising:
storing a first partial private key of a private key in a data storage without storing a second partial private key of the private key in the data storage;
in response to receiving, from a user device, a key share recovery request to enable access to a semi-custodial wallet of a user account, authenticating the user device as corresponding to the user account; and
in response to authenticating the user device as corresponding to the user account in connection with the key share recovery request, (i) registering, with a platform service, the user device as corresponding to the user account, and (ii) transmitting, to the user device, the second partial private key to be stored on the user device.

2. A method for managing partial private keys for cryptography-based, storage applications used in blockchain operations, the method comprising:
receiving, from a first user device, an access recovery request to access a first user account corresponding to a first cryptography-based, storage application, wherein the first cryptography-based, storage application is used to perform a plurality of blockchain operations across a computer network based on a combined use of a first public key, a first partial private key, and a second partial private key that is not accessible to a platform service facilitating the first cryptography-based, storage application;
in response to receiving the access recovery request to access the first user account, authenticating, by a first remote device, the first user device as corresponding to the first user account; and
in response to the first remote device authenticating the first user device as corresponding to the first user account in connection with the access recovery request, (i) registering, with the platform service, the first user device as corresponding to the first user account, and (ii) transmitting, to the first user device, an encrypted partial-private-key communication comprising instructions, that when executed by the first user device, causes the second partial private key to be stored on the first user device.

3. The method of claim 2, further comprising:
in response to the first remote device authenticating the first user device as corresponding to the first user account in connection with the access recovery request, receiving, from a second user device, an authorization for the platform service to transmit the encrypted partial-private-key communication to the first user device.

4. The method of claim 2, wherein transmitting the encrypted partial-private-key communication comprises:
receiving, from a second user device, an authorization request to authorize the platform service to transmit the encrypted partial-private-key communication to the first user device;
in response to receiving the authorization request from the second user device to authorize the platform service to transmit the encrypted partial-private-key communication, querying the second user device for a recovery key that corresponds to the first user account; and
determining to generate the encrypted partial-private-key communication based on the recovery key.

5. The method of claim 4, wherein the recovery key is not compatible with the first public key and the first partial private key of the plurality of blockchain operations.

6. The method of claim 2, further comprising:
in connection with registering the first user device as corresponding to the first user account and transmitting the encrypted partial-private-key communication to the first user device, revoking access to the first user account away from at least one other user device that currently stores a partial private key that corresponded to the first cryptography-based, storage application.

7. The method of claim 2, wherein transmitting the encrypted partial-private-key communication comprises:
determining a plurality of user devices that currently have recovery rights for the first user account;
querying the plurality of user devices for authorization to generate the encrypted partial-private-key communication;
determining that a threshold number of the plurality of user devices provided authorization to generate the encrypted partial-private-key communication; and
in response to (i) authenticating the first user device as corresponding to the first user account in connection with the access recovery request and (ii) determining that the threshold number of the plurality of user devices provided authorization to generate the encrypted partial-private-key communication, transmitting the encrypted partial-private-key communication to the first user device.

8. The method of claim 2, wherein transmitting the encrypted partial-private-key communication comprises:
determining a first time at which the access recovery request was received;
determining that a difference between the first time and a current time meets a threshold time difference; and
in response to (i) authenticating the first user device as corresponding to the first user account in connection with the access recovery request and (ii) determining that the difference between the first time and the current time meets the threshold time difference, transmitting the encrypted partial-private-key communication to the first user device.

9. The method of claim 2, wherein transmitting the encrypted partial-private-key communication comprises:
determining a number of user devices currently authorized to access the first user account;
retrieving a threshold number of user devices, wherein the threshold number of user devices corresponds to a maximum number of user devices that are authorized for a single user account; and
determining whether the number of user devices meets the threshold number of user devices.

10. The method of claim 2, wherein the instructions cause a private key to be used in signing a block of data or verifying a signed block within a secure enclave.

11. The method of claim 2, wherein the first partial private key and the second partial private key are generated by:
receiving a public key encryption for the first user device;
generating a ciphertext for the public key encryption; and
splitting the ciphertext to generate the first partial private key and the second partial private key.

12. One or more non-transitory, computer-readable media comprising instructions that, when executed by one or more processors, causes operations comprising:
receiving, from a first user device, an access recovery request to access a first user account corresponding to a first cryptography-based, storage application, wherein the first cryptography-based, storage application is used to perform a plurality of blockchain operations across a computer network based on a combined use of a first public key, a first partial private key, and a second partial private key that is not accessible to a platform service facilitating the first cryptography-based, storage application;
in response to receiving the access recovery request, authenticating, at a first remote device, the first user device as corresponding to the first user account;
in response to authenticating the first user device, (i) registering, with the platform service, the first user device as corresponding to the first user account, and (ii) transmitting, to the first user device, an encrypted communication comprising instructions, that when executed by the first user device, causes the second partial private key to be stored on the first user device.

13. The one or more non-transitory, computer-readable media of claim 12, the operations further comprising:
receiving, from the first user device, a second request to perform a blockchain operation corresponding to the first public key;
retrieving, from the first user account, the first partial private key and a first user address;
querying the first user device for use of the second partial private key in performing the blockchain operation;
generating a first digital signature based on the first partial private key and the second partial private key; and
performing the blockchain operation based on the first digital signature and the first user address.

14. The one or more non-transitory, computer-readable media of claim 12, wherein generating the encrypted communication for the first user device comprises:
receiving, from a second user device, an authorization request to authorize the platform service to transmit the encrypted communication to the first user device;
querying the second user device for a recovery key that corresponds to the first user account; and
determining to generate the encrypted communication based on the recovery key.

15. The one or more non-transitory, computer-readable media of claim 14, wherein the recovery key is not compatible with the first public key and the first partial private key of the plurality of blockchain operations.

16. The one or more non-transitory, computer-readable media of claim 12, the operations further comprising:
in connection with registering the first user device as corresponding to the first user account and transmitting the encrypted communication to the first user device, revoking access to the first user account away from at least one other user device that currently stores a partial private key that corresponded to the first cryptography-based, storage application.

17. The one or more non-transitory, computer-readable media of claim 12, wherein transmitting the encrypted communication comprises:
determining a plurality of user devices that currently have recovery rights for the first user account;
querying the plurality of user devices for authorization to generate the encrypted communication; and
in response to (i) authenticating the first user device as corresponding to the first user account in connection with the access recovery request and (ii) determining that a threshold number of the plurality of user devices provided authorization to generate the encrypted communication, transmitting the encrypted communication to the first user device.

18. The one or more non-transitory, computer-readable media of claim 12, wherein transmitting the encrypted communication comprises:
- determining a first time at which the access recovery request was received;
- in response to (i) authenticating the first user device as corresponding to the first user account in connection with the access recovery request and (ii) determining that a difference between the first time and a current time meets a threshold time difference, transmitting the encrypted communication to the first user device.

19. The one or more non-transitory, computer-readable media of claim 12, wherein transmitting the encrypted communication to the first user device comprises:
- determining a number of user devices currently authorized to access the first user account;
- retrieving a threshold number of user devices, wherein the threshold number of user devices corresponds to a maximum number of user devices that are authorized for a single user account; and
- determining whether the number of user devices meets the threshold number of user devices.

20. The one or more non-transitory, computer-readable media of claim 12, wherein the first partial private key and the second partial private key are generated by:
- receiving a public key encryption for the first user device;
- generating a ciphertext for the public key encryption; and
- splitting the ciphertext to generate the first partial private key and the second partial private key.

* * * * *